United States Patent
Ueno

(10) Patent No.: US 8,442,725 B2
(45) Date of Patent: May 14, 2013

(54) OCCUPANT PROTECTION DEVICE FOR VEHICLE

(75) Inventor: Yukiyasu Ueno, Nishio (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/413,775

(22) Filed: Mar. 7, 2012

(65) Prior Publication Data

US 2012/0179335 A1 Jul. 12, 2012

Related U.S. Application Data

(63) Continuation of application No. 12/380,114, filed on Feb. 24, 2009, now Pat. No. 8,155,842.

(30) Foreign Application Priority Data

Feb. 25, 2008 (JP) ................................. 2008-042966

(51) Int. Cl.
*B60R 22/00* (2006.01)

(52) U.S. Cl.
USPC .......................................................... 701/45

(58) Field of Classification Search ...................... 701/45
See application file for complete search history.

(56) References Cited

U.S. PATENT DOCUMENTS

| | | | |
|---|---|---|---|
| 8,155,842 B2 * | 4/2012 | Ueno | ............................. 701/45 |
| 2005/0209756 A1 | 9/2005 | Ueno | |
| 2007/0000711 A1 | 1/2007 | Yamaguchi et al. | |
| 2007/0024037 A1 | 2/2007 | Ueno | |
| 2007/0233919 A1 | 10/2007 | Miura | |

FOREIGN PATENT DOCUMENTS

| | | |
|---|---|---|
| JP | 2005-263145 | 9/2005 |
| JP | 2007-008392 | 1/2007 |
| JP | 2007-030766 | 2/2007 |
| JP | 2007/215102 | 8/2007 |

* cited by examiner

*Primary Examiner* — Eric Culbreth
(74) *Attorney, Agent, or Firm* — Harness, Dickey & Pierce, PLC

(57) ABSTRACT

An occupant protection device includes: a controller; first and second bus lines; a first collision sensor arranged on a side of the vehicle, and transmitting a first signal to the controller via the first bus line; a second collision sensor arranged on a center of the vehicle, and transmitting a second signal to the controller via the second bus line; and a third collision sensor arranged on a front side from the first collision sensor, and transmitting a third signal to the controller via the second bus line. The controller determines the collision on the side of the vehicle based on the first and second signals. The controller determines the collision on a part of the vehicle based on the third signal, the part disposed on the front side from the first collision sensor. The controller activates an occupant protection element.

9 Claims, 6 Drawing Sheets

US 8,442,725 B2

OCCUPANT PROTECTION DEVICE FOR VEHICLE

CROSS REFERENCE TO RELATED APPLICATION

This application is a continuation of U.S. patent application Ser. No. 12/380,114 filed on Feb. 24, 2009, which claims the benefit and priority of Japanese Patent Application No. 2008-042966 filed Feb. 25, 2008, the disclosures of which are incorporated herein by reference.

FIELD OF THE INVENTION

The present invention relates to an occupant protection device having multiple sensors for detecting collision of a vehicle. A signal of the collision is transmitted from the sensors through a bus line.

BACKGROUND OF THE INVENTION

An occupant protection device for a vehicle includes multiple sensors for detecting collision of the vehicle and a bus line for transmitting a signal of the collision therethrough. JP-A-2007-215102 corresponding to US Patent Application Publication No. 2007/0233919 teaches an air bag device as the occupant protection device. The air bag device includes multiple slave sensors, an air bag ECU, a driver side air bag, a passenger side air bag, a side air bag, a curtain air bag and the like.

The slave sensors are arranged on a right front side, a left front side, a right side near a B pillar, the right side near a C pillar, a left side near the B pillar and the left side near the C pillar in the vehicle. The slave sensors on the right and left front sides detect acceleration in a front-rear direction of the vehicle, and transmit signals via a communication bus line. The slave sensor on the right front side is connected to an air bag ECU via a communication bus line, which is different from a bus line for the slave sensor on the left front side. The slave sensor on the left front side is connected to the air bag ECU via another communication bus line. The slave sensors on the right side near the B pillar and the right side near the C pillar detect acceleration in a right-left direction of the vehicle, and transmit signals via a communication bus line, which is different from a bus line for the slave sensors on the left side near the B pillar and the left side near the C pillar. The slave sensors on the right side near the B pillar and the right side near the C pillar are connected to the air bag ECU via a communication bus line, and the slave sensors on the left side near the B pillar and the left side near the C pillar are connected to the air bag ECU via another communication bus line.

The air bag ECU includes an internal acceleration sensor in the ECU. The ECU determines based on detection results of the slave sensors and the internal acceleration sensor whether the collision occurs. The ECU controls inflation of the driver side air bag, the passenger side air bag, the side air bag and the curtain air bag. Specifically, based on the detection results of the slave sensors on the right and left front sides of the vehicle and the internal acceleration sensor, the ECU controls the inflation of the driver side air bag and the passenger side air bag. Based on the detection results of the slave sensors on the right and left sides near the B pillar and the internal acceleration sensor, the ECU controls the inflation of the side air bag. Based on the detection results of the slave sensors on the right and left sides near the C pillar and the internal acceleration sensor, the ECU controls the inflation of the curtain air bag.

In the air bag device, the air bag ECU is arranged at a position on a front side from a center of the vehicle. Therefore, even when the side of the vehicle near the C pillar collides with an object, the ECU is far apart from the collision portion of the vehicle. Thus, the internal acceleration sensor in the ECU cannot accurately detect the acceleration generated by the collision.

In view of the above difficulty, as shown in FIG. 7, a slave sensor 10 is arranged at a center in the right-left direction of the vehicle near the C pillar. The sensor 10 detects the acceleration in the right-left direction of the vehicle, and the sensor transmits a signal to the air bag ECU 11 via a communication bus line. The ECU 11 controls the inflation of the curtain air bag based on the detection results of the slave sensors 12, 13 near the C pillar and the slave sensor 10 at the center of the vehicle. The sensors 12, 13 on the side of the vehicle near the C pillar function as a main sensor, and the sensor 10 at the center of the vehicle near the C pillar functions as a safing sensor. If the slave sensors 12, 13 and the slave sensor 10 are connected to the ECU 11 via the same communication bus line, the main sensor and the safing sensor are connected to the ECU via the same line. Therefore, when the line is down, the ECU 11 may mistake to detect the collision. Accordingly, as shown in FIG. 7, the sensors 12, 13 near the C pillar are respectively connected to the ECU 11 via the line B1, B2, which is different from the line B3 for the sensor 10 at the center of the vehicle. Thus, the number of the bus lines increases.

SUMMARY OF THE INVENTION

In view of the above-described problem, it is an object of the present disclosure to provide an occupant protection device having multiple detection elements for detecting collision of a vehicle.

According to a first aspect of the present disclosure, an occupant protection device for a vehicle includes: a controller; first and second bus lines; a first collision detection element arranged on a side of the vehicle, detecting a collision in a right-left direction of the vehicle, and transmitting a first detection signal to the controller via the first bus line; a second collision detection element arranged on a center of the vehicle in the right-left direction of the vehicle, detecting the collision in the right-left direction of the vehicle, and transmitting a second detection signal to the controller via the second bus line; and a third collision detection element arranged on a front side from the first collision detection element, detecting the collision, and transmitting a third detection signal to the controller via the second bus line. The controller determines the collision on the side of the vehicle based on the first and second detection signals from the first and second collision detection elements. The controller determines the collision on a part of the vehicle based on the third detection signal from the third collision detection element. The part of the vehicle is disposed on the front side from the first collision detection element. The controller controls to activate an occupant protection element corresponding to the collision. The first bus line is different from the second bus line.

In the above device, the first collision detection element is connected to the controller via the first bus line, which is different from the second bus line for connecting the second collision detection element to the controller without increasing the number of bus lines.

According to a second aspect of the present disclosure, an occupant protection device for a vehicle includes: a controller; first to fourth bus lines; a second row right side collision sensor arranged on a right side of the vehicle near a second row of seats, detecting an acceleration in a right-left direction of the vehicle, and transmitting a signal to the controller via the first bus line; a second row left side collision sensor arranged on a left side of the vehicle near the second row of seats, detecting an acceleration in the right-left direction of the vehicle, and transmitting a signal to the controller via the first bus line; a first row right side collision sensor arranged on the right side of the vehicle near a first row of seats, detecting an acceleration in the right-left direction of the vehicle, and transmitting a signal to the controller via the second bus line; a first row left side collision sensor arranged on the left side of the vehicle near the first row of seats, detecting an acceleration in the right-left direction of the vehicle, and transmitting a signal to the controller via the second bus line; a center collision sensor arranged on a center of the vehicle in the right-left direction, detecting an acceleration in the right-left direction of the vehicle, and transmitting a signal to the controller via the second bus line; a right front side collision sensor arranged on a right front side of the vehicle, detecting an acceleration in a front-rear direction of the vehicle, and transmitting a signal to the controller via the third bus line; and a left front side collision sensor arranged on a left front side of the vehicle, detecting an acceleration in the front-rear direction of the vehicle, and transmitting a signal to the controller via the fourth bus line. The first to fourth bus lines are different from each other.

In the above device, the second row and left right side collision sensors are connected to the controller via the first bus line, which is different from the second bus line for connecting the center collision sensor to the controller without increasing the number of bus lines.

According to a third aspect of the present disclosure, an occupant protection device for a vehicle includes: a controller; first right and left side bus lines and second right and left side bus lines; a first row right side collision sensor arranged on a right side of the vehicle near a first row of seats, detecting an acceleration in a right-left direction of the vehicle, and transmitting a signal to the controller via the first right side bus line; a second row right side collision sensor arranged on the right side of the vehicle near a second row of seats, detecting an acceleration in the right-left direction of the vehicle, and transmitting a signal to the controller via the first right side bus line; a first row left side collision sensor arranged on a left side of the vehicle near the first row of seats, detecting an acceleration in the right-left direction of the vehicle, and transmitting a signal to the controller via the first left side bus line; a second row left side collision sensor arranged on the left side of the vehicle near the second row of seats, detecting an acceleration in the right-left direction of the vehicle, and transmitting a signal to the controller via the first left side bus line; a center collision sensor arranged on a center of the vehicle in the right-left direction, detecting an acceleration in the right-left direction of the vehicle, and transmitting a signal to the controller via the second left side bus line; a left front side collision sensor arranged on a left front side of the vehicle, detecting an acceleration in a front-rear direction of the vehicle, and transmitting a signal to the controller via the second left side bus line; and a right front side collision sensor arranged on a right front side of the vehicle, detecting an acceleration in a front-rear direction of the vehicle, and transmitting a signal to the controller via the second right side bus line. The first right and left side bus lines and the second right and left side bus lines are different from each other.

In the above device, the first and second row right side collision sensors are connected to the controller via the first right side bus line, which is different from the second left side bus line for connecting the center collision sensor to the controller without increasing the number of bus lines. Further, the first and second row left side collision sensors are connected to the controller via the first left side bus line, which is different from the second left side bus line for connecting the center collision sensor to the controller without increasing the number of bus lines.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

The present inventor has studied about an occupant protection device for a vehicle having first and second collision detection elements, which are independently connected to a controller via bus lines without increasing the number of bus lines. In the device, the first collision detection element is connected to the controller via the first bus line, and the second collision detection element is connected to the controller via the second bus line. The third collision detection element is connected to the controller via the same second bus line, so that the number of bus lines does not increase.

First Embodiment

Figure 1:
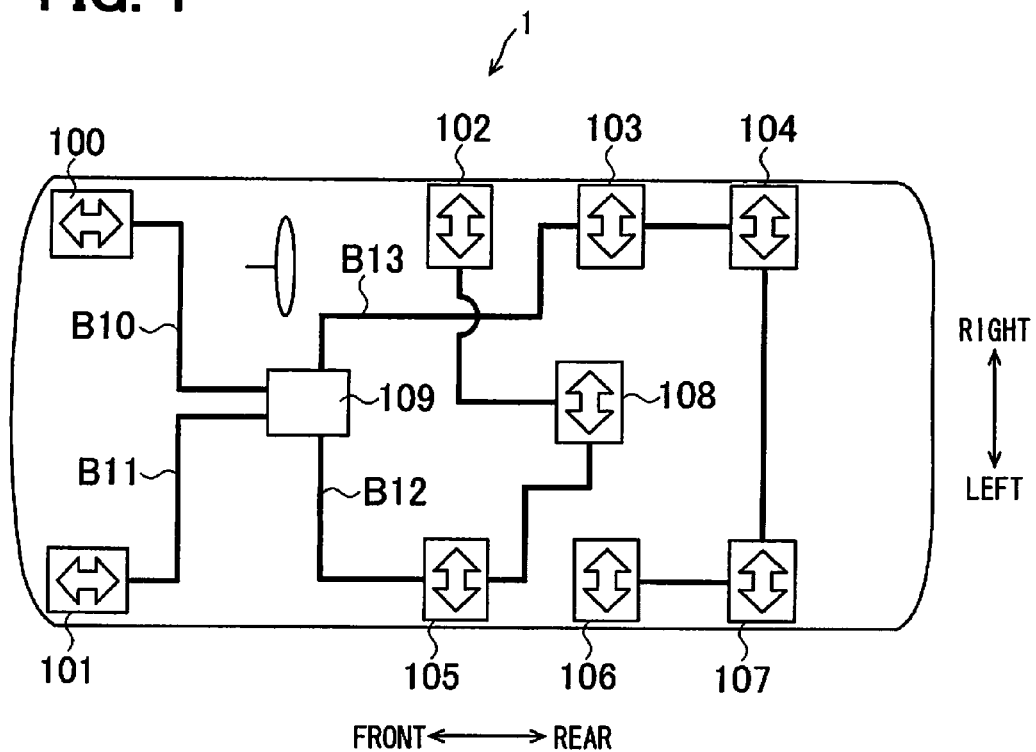
FIG. 1 is a diagram showing an occupant protection device according to a first embodiment.

An occupant protection device 1 for a vehicle according to a first embodiment is shown in FIG. 1. The vehicle includes two rear seats so that the vehicle includes the first to third rows of seats in the front-rear direction of the vehicle. RIGHT and LEFT in FIG. 1 represent a right-left direction of the vehicle, and FRONT and REAR in FIG. 1 represent a front-rear direction of the vehicle.

The device 1 provides to protect an occupant in the vehicle when the device 1 detects collision of a front and/or a side of the vehicle. The device 1 includes a right front sensor 100, a left front sensor 101, a first row right side sensor 102, a second row right side sensor 103, a third row right side sensor 104, a first row left side sensor 105, a second row left side sensor 106, a third row left side sensor 107, a center acceleration sensor 108 and a controller 109. The first row right and left side sensors 102, 105 provide a third collision detection elements, the second and third row right and left side sensors 103, 104, 106, 107 provide a first collision detection element, and the center acceleration sensor 108 provides a second collision detection element. The right and left front sensors 100, 101 detect longitudinal acceleration along with the front rear direction of the vehicle. Other sensors 102-108 detect lateral acceleration along with the right left direction of the vehicle.

The right front sensor 100 is arranged on a right front side of the vehicle, and detects the collision along with the front rear direction of the vehicle. The sensor 100 detects the acceleration and transmits a signal via a bus line. The left front sensor 101 is arranged on a left front side of the vehicle, and detects the collision along with the front rear direction of the vehicle. The sensor 101 detects the acceleration and transmits a signal via the bus line. The right and left front sensors 100, 101 are mounted in a front bumper, for example.

The first right side sensor 102 is arranged on a right side of the first row of the seats, which is disposed on a front side from a center of the vehicle. The sensor 102 detects the collision along with the right left direction of the vehicle, detects the acceleration, and transmits a signal via the bus line. The second and third right side sensors 103, 104 are arranged on the right side of the vehicle of the second and third rows of the seats, which are on a rear side from the first right side sensor 102. The sensors 103, 104 detect the acceleration in the right and left direction of the vehicle, and transmit signals via the bus line. The first left side sensor 105 is arranged on a left side of the first row of the seats, which is disposed on the front side from the center of the vehicle. The sensor 105 detects the collision along with the right left direction of the vehicle, detects the acceleration, and transmits a signal via the bus line. The second and third left side sensors 106, 107 are arranged on the left side of the vehicle of the second and third rows of the seats, which are on a rear side from the first left side sensor 105. The sensors 106, 107 detect the acceleration in the right and left direction of the vehicle, and transmit signals via the bus line. The right and left side sensors 102, 105 are mounted in a door, for example.

The center acceleration sensor 108 is arranged at a center in the right left direction of the vehicle, which is disposed on a rear side from the side sensors 102, 105. The sensor 108 detects the collision in the right left direction of the vehicle. Specifically, the sensor 108 detects the acceleration, and transmits a signal via the bus line.

The controller 109 determines the collision based on the detection results of the sensors 100-108 and an internal sensor in the controller 109, and controls inflation of an air bag as an occupant protection element and function of a pre-tensioner as another occupant protection element.

The right front sensor 100 is connected to the controller 109 via a bus line B10, and the left front sensor 101 is connected to the controller 109 via a bus line B11. The first right side sensor 102, the first left side sensor 105 and the center acceleration sensor 108 are connected to the controller 109 via a bus line B12 as a first bus line. The second and third right side sensors 103, 104 and the second and third left side sensors 106, 107 are connected to the controller 109 via a bus line B13 as a second bus line. Thus, the second and third right side sensors 103, 104 and the second and third left side sensors 106, 107 are connected to the controller 109 via the second bus line B13, which is different from the first bus line B12 for connecting the center acceleration sensor 108 to the controller 109.

Figure 2:
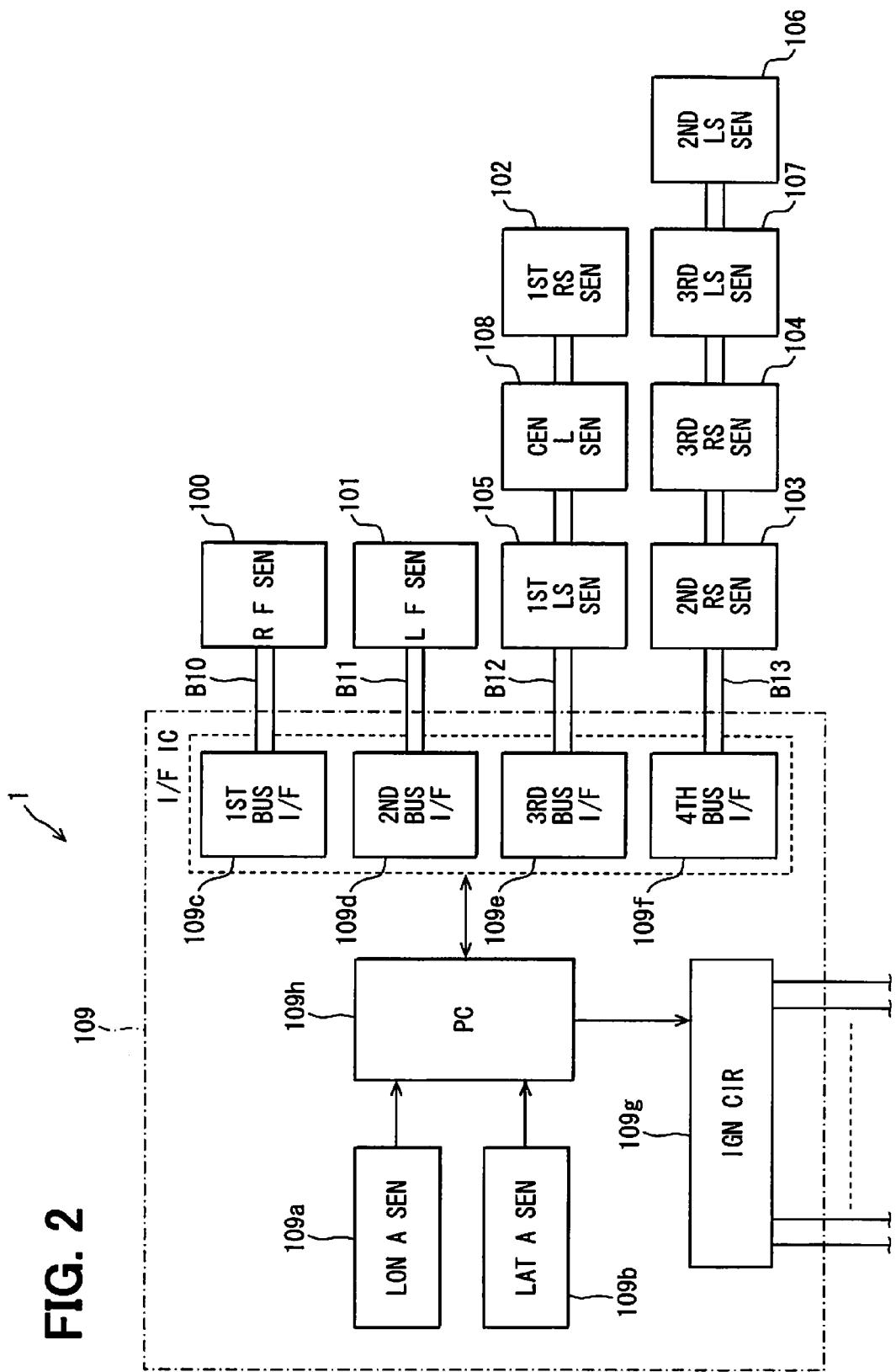
FIG. 2 is a block diagram showing a controller in FIG. 1.

The controller 109 will be explained with reference to FIG. 2. In FIG. 2, I/F represents a bus interface, and PC represents a micro computer.

The controller 109 includes a longitudinal acceleration sensor 109a, a latitudinal acceleration sensor 109b, first to fourth bus interface circuits 109c-109f, an ignition circuit 109g and a micro computer 109h.

The longitudinal acceleration sensor 109a is disposed in the controller 109, and detects the collision along with the front rear direction of the vehicle. The sensor 109a detects the acceleration in the front rear direction of the vehicle. The latitudinal acceleration sensor 109b is disposed in the controller 109, and detects the collision along with the right left direction of the vehicle. The sensor 109b detects the acceleration in the right left direction of the vehicle.

The first to fourth bus interface circuits 109c-109f convert the detection results transmitted from the sensors 100-108 via the bus lines B10-B13 to a predetermined format, and input the results having the predetermined format into the micro computer 109h. The first to fourth bus interface circuits 109c-109f are integrated into one body as a bus interface IC. The first bus interface circuit 109c is connected to the right front sensor 100 via the bus line B10. The second bus interface circuit 109d is connected to the left front sensor 101 via the bus line B11. The third bus interface circuit 109e is connected to the first right side sensor 102, the first left side sensor 105 and the center acceleration sensor 108 via the bus line B12. The fourth bus interface circuit 109f is connected to the second and third right side sensors 103, 104 and the second and third left side sensors 106, 107 via the bus line B13. Further, the first to fourth bus interface circuits 109c-109f are connected to the micro computer 109h.

The ignition circuit 109g activates the air bag and the pretensioner based on an ignition signal or an activation signal from the micro computer 109h.

The micro computer 109h determines the collision of the vehicle based on the detection results inputted from the sensors 100-108 via the first to fourth bus interface circuits 109c-109f and the detection results from the sensors 109a-109b. The micro computer 109h outputs the ignition signal for activating the air bag and the pretensioner to the ignition circuit 109g. Here, the air bag and the pretensioner correspond to the collision of the vehicle. Specifically, the micro computer 109h detects the collision on the front side of the vehicle based on the detection results of the longitudinal acceleration sensor 109a, the right front sensor 100 and the left front sensor 101, and the micro computer 109h outputs the ignition signal for activating the air bag and the pretensioner corresponding to the collision on the front side of the vehicle. The micro computer 109h detects the collision on the side of the vehicle near the first row of the seats based on the detection results of the latitudinal acceleration sensor 109b, the first right side sensor 102, and the first left side sensor 105, and the micro computer 109h outputs the ignition signal for activating the air bag and the pretensioner corresponding to the collision on the side of the vehicle near the first row of the seats. The micro computer 109h detects the collision on the side of the vehicle near the second row of the seats based on the detection results of the second right side sensor 103, the second left side sensor 106 and the center acceleration sensor 108, and the micro computer 109h outputs the ignition signal for activating the air bag and the pretensioner corresponding to the collision on the side of the vehicle near the second row of the seats. The micro computer 109h detects the collision on the side of the vehicle near the third row of the seats based on the detection results of the third right side sensor 104, the third left side sensor 107 and the center acceleration sensor 108, and the micro computer 109h outputs the ignition signal for activating the air bag and the pretensioner corresponding to the collision on the side of the vehicle near the third row of the seats.

The micro computer 109h is connected to both of the longitudinal acceleration sensor 109a and the latitudinal acceleration sensor 109b. Further, the micro computer 109h is connected to the first to fourth bus interface circuits 109c-109f and the ignition circuit 109g.

The functions of the occupant protection device will be explained with reference to FIGS. 1 and 2.

When the collision on the right side of the vehicle near the first row of the seats occurs, the acceleration, i.e., the impact corresponding to the collision is generated. The acceleration is remarkably detected by the first right side sensor 102. Further, the collision is also detected by the latitudinal acceleration sensor 109b in the controller 109. The detection result of the first right side sensor 102 is transmitted to the controller 109 via the bus line B12. The transmitted result is converted by the third bus interface circuit 109e to have a predetermined format. Then, the converted result is input in the micro computer 109h. Further, the detection result of the latitudinal acceleration sensor 109b is also input in the micro computer 109h.

The micro computer 109h determines the collision on the side of the vehicle near the first row of seats on the basis of the detection results of the first right side sensor 102 and the latitudinal acceleration sensor 109b. Specifically, when an integration value of the acceleration per a predetermined interval that is detected by the first right side sensor 102 exceeds a predetermined threshold, and when an integration value of the acceleration per a predetermined interval that is detected by the latitudinal acceleration sensor 109b exceeds a predetermined threshold, the micro computer 109h determines that the collision on the right side of the vehicle near the first row of seats occurs. Then, the micro computer outputs the ignition signal for activating the air bag and the pretensioner corresponding to the collision on the right side of the vehicle near the first row of seats. When the ignition signal is input in the ignition circuit 109g, the ignition circuit 109g activates the air bag and the pretensioner based on the ignition signal. Thus, the air bag and the pretensioner protect the occupant.

When the collision on the right side of the vehicle near the second row of seats occurs, the acceleration in the right left direction is generated. The acceleration is remarkably detected by the second right side sensor 103. Further, the acceleration is also detected by the center acceleration sensor 108. The detection result of the second right side sensor 103 is transmitted to the controller 109 via the bus line B13. The transmitted result is converted to have a predetermined format by the fourth bus interface circuit 109f. Then, the converted result is input in the micro computer 109h. The detection result of the center acceleration sensor 108 is input in the controller 109 via the bus line B12. The transmitted result is converted to have a predetermined format by the third bus interface circuit 109e. Then, the converted result is input in the micro computer 109h.

The micro computer 109h determines the collision on the right side of the vehicle near the second row of seats on the basis of the detection results of the second right side sensor 103 and the center acceleration sensor 108. Specifically, when an integration value of the acceleration per a predetermined interval that is detected by the second right side sensor 103 exceeds a predetermined threshold, and when an integration value of the acceleration per a predetermined interval that is detected by the center acceleration sensor 108 exceeds a predetermined threshold, the micro computer 109h determines that the collision on the right side of the vehicle near the second row of seats occurs. Then, the micro computer 109h outputs the ignition signal for activating the air bag and the pretensioner corresponding to the collision on the right side of the vehicle near the second row of seats. When the ignition signal is input in the ignition circuit 109g, the ignition circuit 109g activates the air bag and the pretensioner based on the ignition signal. Thus, the air bag and the pretensioner protect the occupant.

When the collision on the right side of the vehicle near the third row of seats occurs, the acceleration in the right left direction is generated. The acceleration is remarkably detected by the third right side sensor 104. Further, the acceleration is also detected by the center acceleration sensor 108. Similar to a case where the collision on the right side of the vehicle near the second row of seats occurs, based on the detection results of the third right side sensor 104 and the center acceleration sensor 108, the air bag and the pretensioner corresponding to the collision on the right side of the vehicle near the third row of seats are activated so that the air bag and the pretensioner protect the occupant.

Similar to cases where the collisions on the right side of the vehicle near the first to third rows of seats, when the collision on the left side of the vehicle near the first, second or third row of seats occurs, the collision is detected by using the first to third left side sensors 105-107, the center acceleration sensor 108, and the latitudinal acceleration sensor 109b in the controller 109.

When the collision on the right front side of the vehicle occurs, the acceleration in the right left direction is generated. The acceleration is remarkably detected by the right front sensor 100. Further, the acceleration is also detected by the longitudinal acceleration sensor 109a in the controller 109. The detection result of the right front sensor 100 is transmitted to the controller 109 via the bus line B10. The transmitted result is converted to have a predetermined format by the first bus interface circuit 109c. Then, the converted result is input in the micro computer 109h. The detection result of the longitudinal acceleration sensor 109a is input in the controller 109.

The micro computer 109h determines the collision on the right front side of the vehicle on the basis of the detection results of the right front sensor 100 and the longitudinal acceleration sensor 109a. Specifically, when an integration value of the acceleration per a predetermined interval that is detected by the right front sensor 100 exceeds a predetermined threshold, and when an integration value of the acceleration per a predetermined interval that is detected by the longitudinal acceleration sensor 109a exceeds a predetermined threshold, the micro computer 109h determines that the collision on the right front side of the vehicle occurs. Then, the micro computer 109h outputs the ignition signal for activating the air bag and the pretensioner corresponding to the collision on the right front side of the vehicle. When the ignition signal is input in the ignition circuit 109g, the ignition circuit 109g activates the air bag and the pretensioner based on the ignition signal. Thus, the air bag and the pretensioner protect the occupant.

In this embodiment, the controller 109 determines the collision on the side of the vehicle near the second and third rows of seats based on the detection results of the sensors 103-104, 106-108. The sensors 103-104, 106-107 are connected to the controller 109 via the bus line B13, which is different from the bus line B12 for connecting the sensors 102, 105 to the controller 109. The center acceleration sensor 108 is connected to the controller 109 via the bus line B12 for connecting the sensors 102, 105 to the controller 109. Accordingly, the sensors 103-104, 106-107 for detecting the collision on the side of the vehicle near the second and third rows of seats are connected to the controller 109 via the bus line B13, which is different from the bus line B12 for connecting the sensor 108 to the controller 109. Further, it is not necessary to add a new independent bus line for connecting the sensor 108 to the controller 109. Accordingly, without increasing the number of bus lines, the sensors 103, 104, 106-107 for detecting the collision on the side of the vehicle near the second and third rows of seats is connected to the controller 109 via the bus line B13, which is different from the bus line B12 for connecting the center acceleration sensor 108 to the controller 109.

Figure 3:
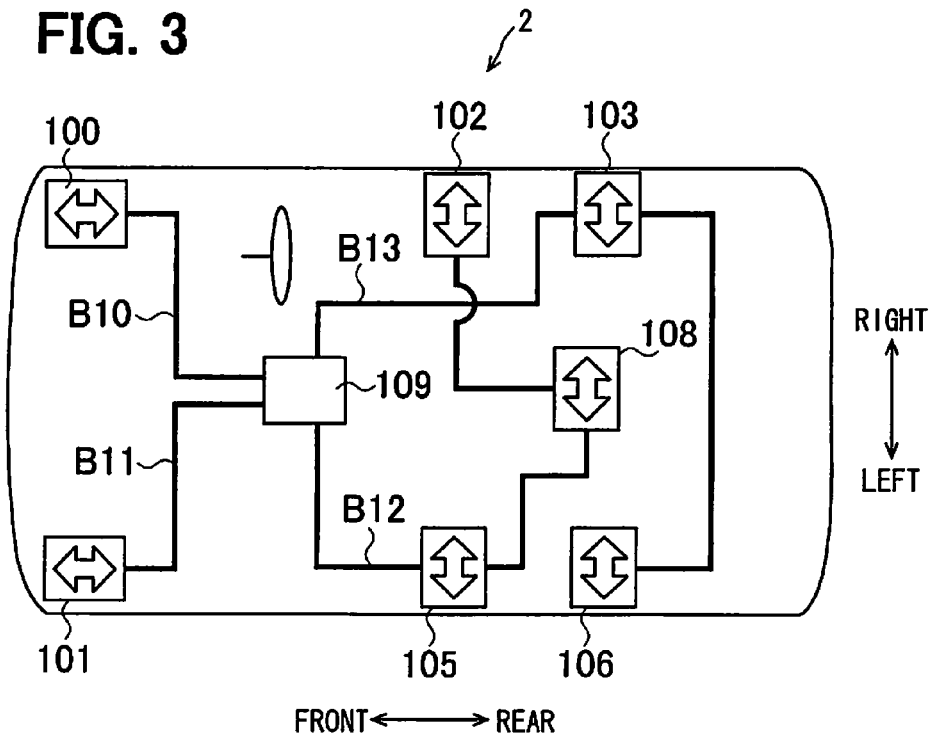
FIG. 3 is a diagram showing an occupant protection device according to a modification of the first embodiment.
Figure 4:
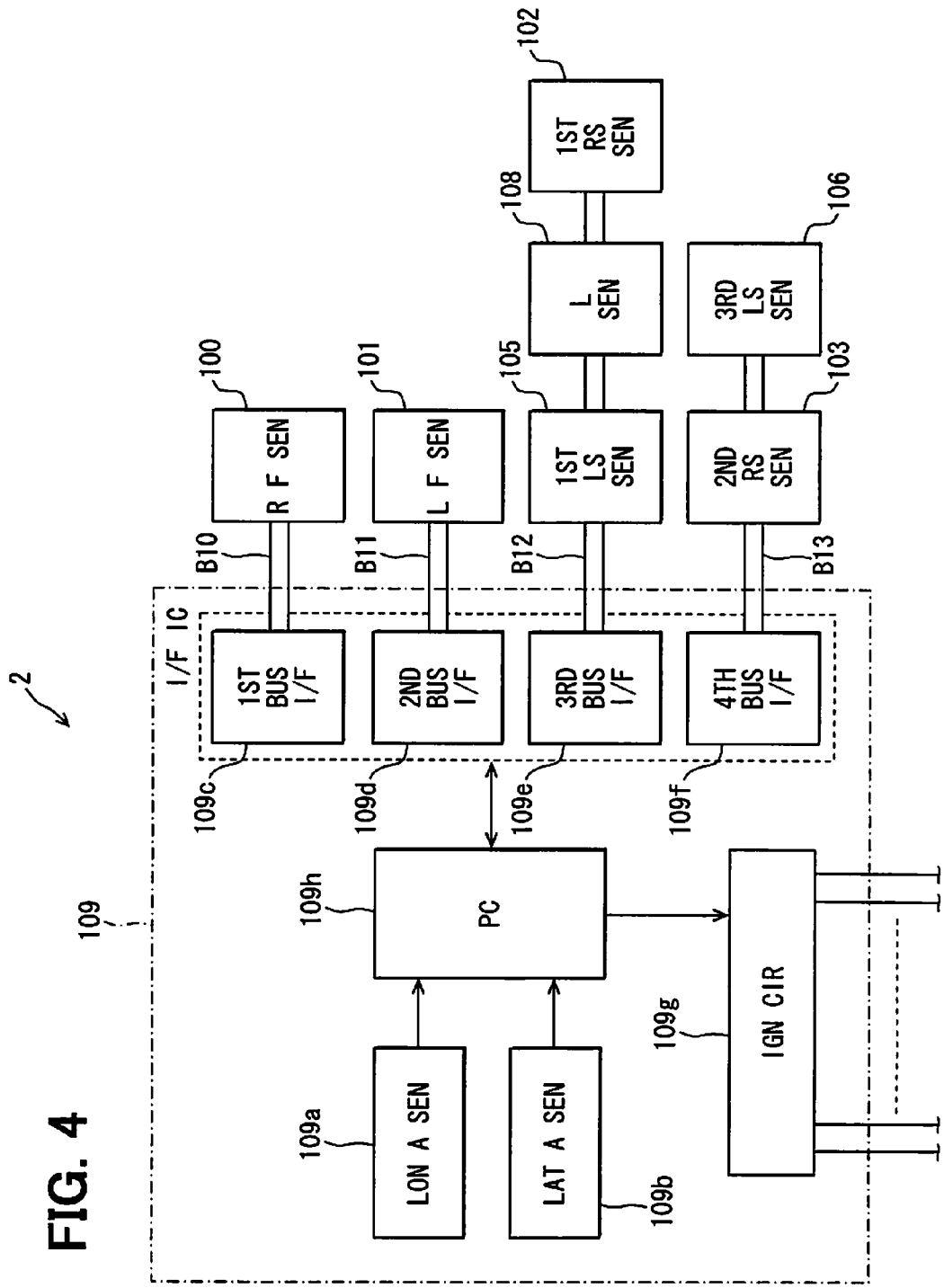
FIG. 4 is a block diagram showing a controller in FIG. 3.

The vehicle has three rows of seats in the front rear direction of the vehicle. Alternatively, the vehicle may have one, two or more than three rows of seats. FIG. 3 shows the vehicle having two rows of seats. In this case, the third right side sensor 104 and the third left side sensor 107 are removed from the device in FIG. 1. FIG. 4 shows an occupant protection device 2 with bus lines B10-B13 and the sensors 100-103, 105-106, 108.

Second Embodiment

An occupant protection device 3 for a vehicle according to a second embodiment will be explained. In the device, a bus line B21 for connecting to the center acceleration sensor 208 is arranged differently from the bus line B11 in FIG. 1. Specifically, the bus line B21 for connecting to the center acceleration sensor 208 is also connected to the left front sensor 201.

Figure 5:
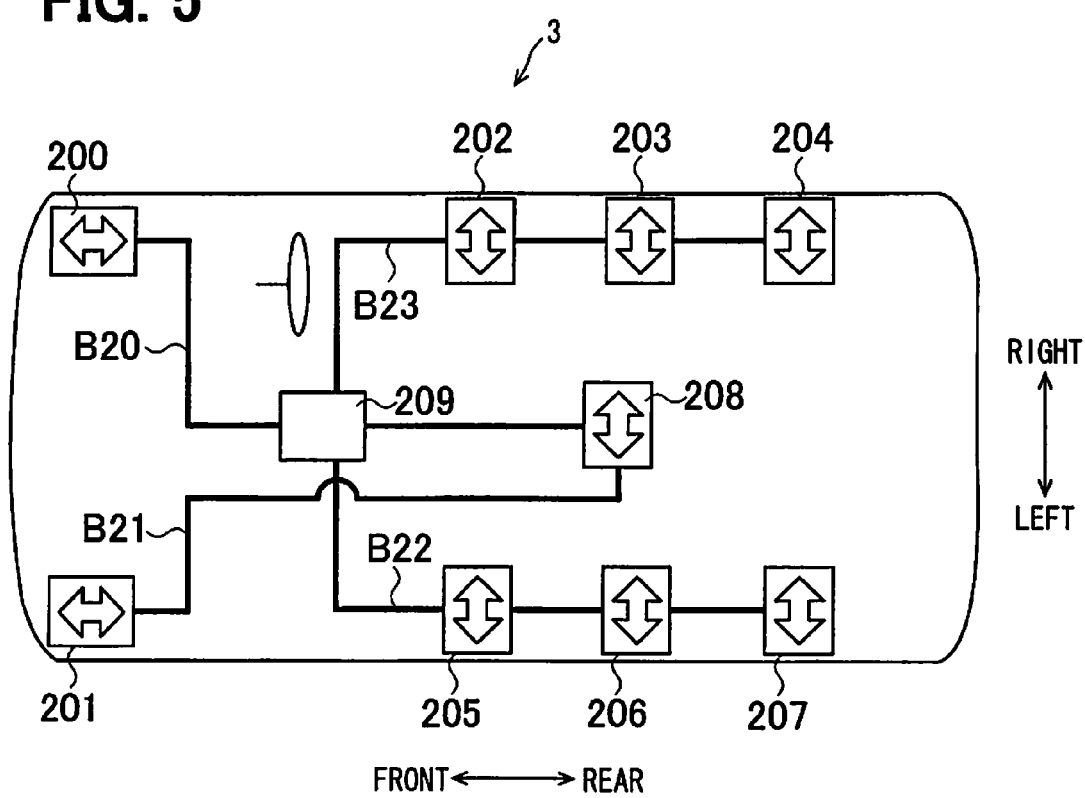
FIG. 5 is a diagram showing an occupant protection device according to a second embodiment.
Figure 6:
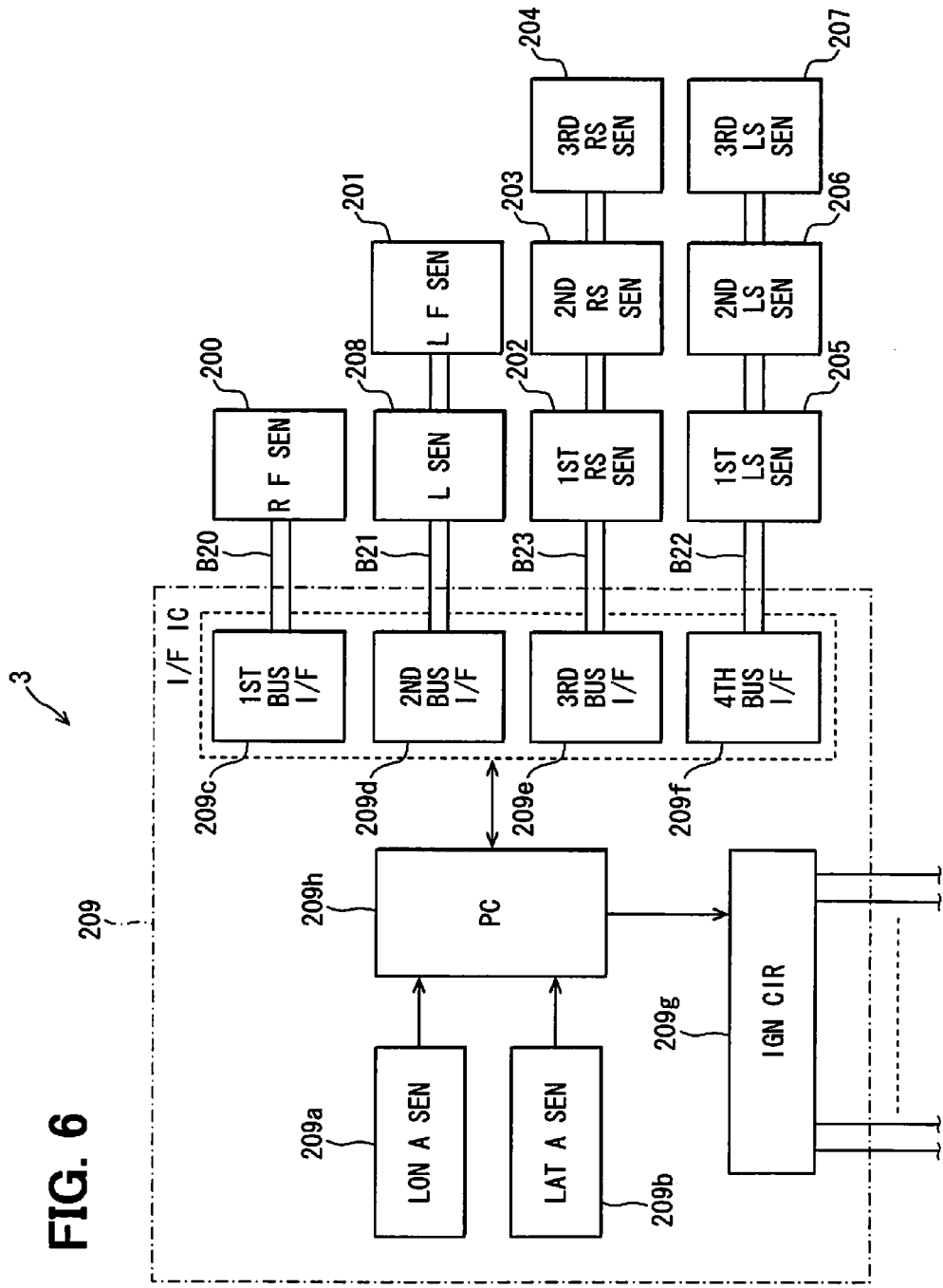
FIG. 6 is a block diagram showing a controller in FIG. 5.
Figure 7:
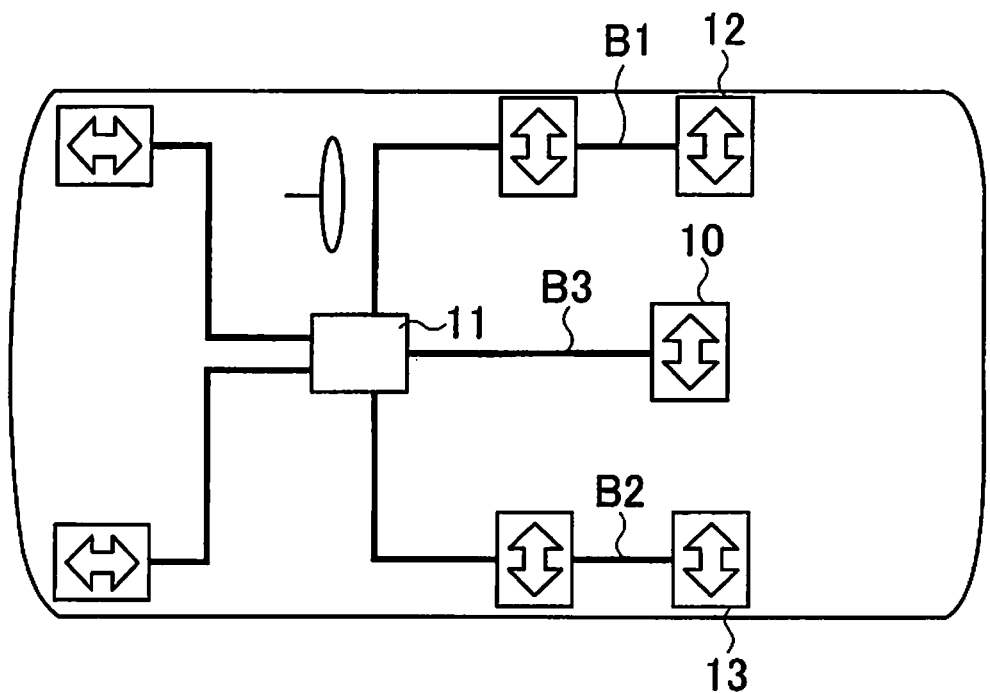
FIG. 7 is a diagram showing an air bag device according to a prior art.

FIG. 5 shows an occupant protection device 3 according to a second embodiment. FIG. 6 shows a block diagram of a controller 209.

The device 3 includes a right front sensor 200, a left front sensor 201 as a third collision detection element, a first right side sensor 202, a second right side sensor 203, a third right side sensor 204, a first left side sensor 205, a second left side sensor 206, a third left side sensor 207, a center acceleration sensor 208 as a second collision detection element and a controller 209. The second and third right side sensors 203, 204 and the second and third left side sensors 206, 207 provide a first collision detection element.

The right front sensor 200 is connected to the controller 209 via the bus line B20. The left front sensor 201 and the center acceleration sensor 208 are connected to the controller 209 via the bus line B21 as a second bus line. Specifically, the center acceleration sensor 208 is arranged on a controller side from the left front sensor 201. Thus, the center acceleration sensor 208 is disposed on the nearest side of the controller 209 in the bus line B21. The first to third right side sensors 202-204 are connected to the controller 209 via the bus line B23 as a first bus line. Further, the first to third left side sensors 205-207 are connected to the controller 209 via the bus line B22 as the first bus line. Thus, the bus line B23 for the side sensors 203, 204, the bus line B22 for the side sensors 206, 207 and the bus line B21 for the center acceleration sensor 208 are different from each other.

As shown in FIG. 6, the controller 209 includes a longitudinal acceleration sensor 209a, a latitudinal acceleration sensor 209b, first to fourth bus interface circuits 209c-209f, an ignition circuit 209g and a micro computer 209h.

The first bus interface circuit 209c is connected to the right front sensor 200 via the bus line B20. The second bus interface circuit 209d is connected to the left front sensor 201 and the center acceleration sensor 208 via the bus line B21. The third bus interface circuit 209e is connected to the first to third right side sensors 202-204 via the bus line B23. The fourth bus interface circuit 209f is connected to the first to third left side sensors 205-207 via the bus line B22.

The functions of the device 3 in FIG. 6 are similar to that of the device 1 in FIG. 2.

The controller 209 determines the collision on the side of the vehicle near the second and third rows of seats based on the detection results of the second and third right side sensors 203, 204, the second and third left side sensors 206, 207 and the center acceleration sensor 208. The second and third right side sensors 203, 204 are connected to the controller 209 via the bus line B22, which is different from the bus line B21 for connecting to the left front sensor 201. The second and third left side sensors 206, 207 are connected to the controller 209 via the bus line B23, which is different from the bus line B21 for connecting to the left front sensor 201. The center acceleration sensor 208 is connected to the controller 209 via the bus line B21, which is the same bus line B21 for connecting to the left front sensor 201. Thus, the second and third right side sensors 203, 204 for detecting the collision on the right side of the vehicle near the second and third rows of seats are connected to the controller 209 via the bus line B23, which is different from the bus line B21 for connecting to the center acceleration sensor 208. The second and third left side sensors 206, 207 for detecting the collision on the left side of the vehicle near the second and third rows of seats are connected to the controller 209 via the bus line B22, which is different from the bus line B21 for connecting to the center acceleration sensor 208. Further, it is not necessary to add a new independent bus line for connecting the center acceleration sensor 208 and the controller 209. Thus, without increasing the number of bus lines, the bus line B21 for connecting to the center acceleration sensor 208, the bus line B23 for connecting to the second and third right side sensors 203, 204, and the bus line B22 for connecting to the second and third left side sensors 206, 207 are different from each other.

The center acceleration sensor 208 is connected to the controller 209 via the bus line B21, which connects to the left front sensor 201. Further, the center acceleration sensor 208 is arranged on a controller side from the left front sensor 201. Thus, the center acceleration sensor 208 is disposed on the nearest side of the controller 209 in the bus line B21. Accordingly, transmission failure of the detection results from the center acceleration sensor 208 to the controller 209 is limited. The transmission failure is occurred by disconnection of bus lines caused by the collision. Thus, even when a secondary collision to the side of the vehicle occurs, the device 3 protects the occupant based on the detection result of the center acceleration sensor 208.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. An occupant protection device for a vehicle comprising:
a controller;
first and second bus lines;
a first collision detection element arranged on a side of the vehicle, detecting a collision in a right-left direction of the vehicle, and transmitting a first detection signal to the controller via the first bus line;
a second collision detection element arranged on a center of the vehicle in the right-left direction of the vehicle, detecting the collision in the right-left direction of the vehicle, and transmitting a second detection signal to the controller via the second bus line; and
a third collision detection element arranged on a front side from the first collision detection element, detecting the collision, and transmitting a third detection signal to the controller via the second bus line, wherein the controller determines the collision on the side of the vehicle based on the first and second detection signals from the first and second collision detection elements, wherein the controller determines the collision on a part of the vehicle based on the third detection signal from the third collision detection element, wherein the part of the vehicle is disposed on the front side from the first collision detection element, wherein the controller controls to activate an occupant protection element corresponding to the collision, wherein the first bus line is different from the second bus line, wherein the third collision detection element is arranged on a first side of a first row of seats in the vehicle, wherein the first collision detection element is arranged on a first side of a row of seats different from the first row in the vehicle, and wherein the controller determines the collision on the side of the vehicle based on the third detection signal from the third collision detection element in addition to the first and second detection signals from the first and second collision detection elements.

2. The occupant protection device according to claim 1, wherein the third collision detection element is arranged on a side of the vehicle, and detects the collision in the right-left direction of the vehicle.

3. The occupant protection device according to claim 1, wherein the first collision detection element is arranged on the side of the vehicle near another row of seats, which is behind the first row of seats.

4. The occupant protection device according to claim 1, wherein the third collision detection element is arranged on a front of the vehicle, and detects the collision in a front-rear direction of the vehicle, and wherein the controller determines the collision on the front of the vehicle based on the third detection signal from the third collision detection element.

5. The occupant protection device according to claim 1, wherein the second collision detection element is nearer the controller in the second bus line than the third collision detection element.

6. An occupant protection device for a vehicle comprising:
a controller;
first and second bus lines;
a first collision detection element arranged on a side of the vehicle, detecting a collision in a right-left direction of the vehicle, and transmitting a first detection signal to the controller via the first bus line;
a second collision detection element arranged on a center of the vehicle in the right-left direction of the vehicle, detecting the collision in the right-left direction of the vehicle, and transmitting a second detection signal to the controller via the second bus line; and
a third collision detection element arranged on a front side from the first collision detection element, detecting the collision, and transmitting a third detection signal to the controller via the second bus line, wherein the controller determines the collision on the side of the vehicle based on the first and second detection signals from the first and second collision detection elements, wherein the controller determines the collision on a part of the vehicle based on the third detection signal from the third collision detection element, wherein the part of the vehicle is disposed on the front side from the first collision detection element, wherein the controller controls to activate an occupant protection element corresponding to the collision, wherein the third collision detection element is arranged on a first side of a first row of seats in the vehicle, wherein the first collision detection element is arranged on a first side of a row of seats different from the first row in the vehicle, wherein both of the second collision detection element and the third collision detection element are coupled with the controller via the second bus line, wherein the first bus line and the second bus line are independently coupled with the controller, and wherein the controller determines the collision on the side of the vehicle based on the third detection signal from the third collision detection element in addition to the first and second detection signals from the first and second collision detection elements.

7. The occupant protection device according to claim 6, wherein the first collision detection element is arranged on the side of the vehicle near another row of seats, which is behind the first row of seats.

8. The occupant protection device according to claim 6, wherein the third collision detection element is arranged on a front of the vehicle, and detects the collision in a front-rear direction of the vehicle, and wherein the controller determines the collision on the front of the vehicle based on the third detection signal from the third collision detection element.

9. The occupant protection device according to claim 6, wherein the second collision detection element is nearer the controller in the second bus line than the third collision detection element.

* * * * *